United States Patent [19]
Ando et al.

[11] 4,166,868
[45] Sep. 4, 1979

[54] MANUFACTURE OF READY-TO-EAT RICE

[75] Inventors: Momofuku Ando, 7-34, Masumicho, Osaka, Japan; Junichi Minami, Osaka; Mitsumune Takatsu, Shiga; Fumio Ohnishi; Makoto Sawada, both of Osaka, all of Japan

[73] Assignee: Momofuku Ando, Osaka, Japan

[21] Appl. No.: 846,497

[22] Filed: Oct. 27, 1977

Related U.S. Application Data

[63] Continuation of Ser. No. 635,254, Nov. 25, 1975, abandoned, which is a continuation-in-part of Ser. No. 537,821, Dec. 31, 1974, abandoned.

[51] Int. Cl.² ......................... A23B 7/02; A23L 1/182
[52] U.S. Cl. .................................. 426/441; 426/450; 426/625
[58] Field of Search ............... 426/508, 578, 618, 625, 426/438, 439, 457, 458, 441, 440, 462, 464, 468, 661, 450

[56] References Cited

U.S. PATENT DOCUMENTS

| 1,946,803 | 2/1934 | McKay | 426/450 |
| 2,616,808 | 11/1952 | Roberts | 426/439 |
| 2,975,058 | 3/1961 | Colarusso | 426/462 X |
| 3,922,370 | 11/1975 | Prakash | 426/440 X |

FOREIGN PATENT DOCUMENTS

| 46-27339 | 8/1971 | Japan | 426/508 |
| 62019 | 10/1975 | Portugal | |

OTHER PUBLICATIONS

"Rice Chemistry and Technology"; Houston; Published by American Assoc. of Cereal Chemists Inc., St. Paul, Minn. 1972, pp. 421, 387.

Primary Examiner—Kenneth M. Schor
Attorney, Agent, or Firm—Armstrong, Nikaido, Marmelstein & Kubovcik

[57] ABSTRACT

Manufacture of ready-to-eat rice comprises soaking rice in water, gelatinizing the wet rice, pressing the gelatinized rice between rollers to alter the grain structure (to permit easier puffing during frying), adjusting its water content to 8–25% by weight and frying the rice at a temperature of 130°–200° C.

9 Claims, No Drawings

MANUFACTURE OF READY-TO-EAT RICE

This is a continuation of application Ser. No. 635,254, filed Nov. 25, 1975, which in turn is a continuation-in-part of Ser. No. 537,821, filed Dec. 31, 1974, both abandoned.

BACKGROUND OF THE INVENTION

The present invention relates to a process for manufacturing ready-to-eat rice, which can be reconstituted into a food preparation with its original shape, good taste and flavor or pleasant sensation to the tongue in a very short time, merely by being mixed with boiling water.

The study and development of the so-called ready-to-eat rice, such as pre-cooked boiled rice, rice gruel, porridge of rice and vegetables and so on, have been known, and these foodstuffs have been on the market. However, such foodstuffs have many defects concerning their precooking and preparation or reconstitution and quality, and no satisfactory product has yet been developed.

The conventional manufacturing process of ready-to-eat rice is divided broadly into three categories as follows:

(1) Rice is boiled and then dried.
(2) Rice is boiled and then fried in oil.
(3) Rice is boiled, flattened and then dried.

However, the rice made by the first process as mentioned above in (1) needs a longer time for restoration to its original shape and lacks stickiness peculiar to boiled rice and pleasant texture to the tongue.

The second process as mentioned above in (2) requires a high oil temperature for frying the rice after boiling, and it is therefore rather difficult to maintain the good quality of the boiled rice. Furthermore, the rice made by this process has the defect of not being easily restored to its original shape by merely pouring boiling water on it.

The rice made by the third process as mentioned above in (3) can not be restored to its original shape peculiar to rice, but rather remains in a flattened state, and is far removed from boiled rice in flavor and feel of eating.

SUMMARY OF THE INVENTION

The present invention overcomes such defects of the prior art.

It is a general object of the present invention to provide rice foodstuffs such as pilaff and curried rice which can be made ready to eat a few minutes after simply mixing them with hot water.

It is another object thereof to provide rice foodstuffs which can be prepared as viscous and elastic with hot water as home cooked rice.

It is a further object to provide rice foodstuffs which can be reconstituted into food preparations with their completely original shape.

It is a further object to provide rice foodstuffs which can be prepared for consumption without cooking means such as pans.

It is a further object to provide rice foodstuffs which can be prepared for consumption whenever and wherever hot water is available.

DETAILED DESCRIPTION OF THE INVENTION

The manufacturing process in this invention is described in detail below.

Any edible rice, irrespective of kind and quality, including imported and home-grown rice, can be used for the material to be processed in accordance with this invention.

The grains of rice are first washed with water and soaked in water or liquid seasoning. The water or liquid temperature is preferably lower than 70° C., and the soaking time depends on the water or liquid temperature, with higher temperatures requiring less soaking time. Furthermore, it is preferably that the water content of the soaked rice be 25-40%, more preferably 30-34%, by weight of the rice.

Then, surfactants, e.g. glycerine fatty acid esters, sugar esters, fatty acid monoglycerides, fatty acid sucrose esters, soybean lecithins and yolk lecithins, or edible oil, e.g. palm oil, rice-bran oil, soybean oil, rape seed oil, cottonseed oil, sesame oil, olive oil, coconut oil, lard and tallow, or talc are mixed therewith, preferably in an amount of 0.1-1.0% by weight of the rice. The resultant rice grains are then gelatinized by boiling in water or steaming.

Since the surfactant, edible oil or talc is added in order to prevent the subsequently gelatinized rice grains from sticking to one another and the roll surface used during the pressing steps, a small quantity of such additives will suffice for this purpose.

The rice should be gelatinized to the heart by proper means, such as the usual steam cooking or pressure steam cooking means. The period of steaming depends on the pressure employed. Generally, the conditions range from steaming for 30 minutes at atmospheric pressure to steaming for 4 minutes at a pressure of 3 kg/cm$^2$ above atmospheric pressure.

If the rice is steamed for gelatinization, it is then exposed to air at a temperature of, for example, 20°-100° C. to adjust its water content to 18-35% by weight. If the rice is boiled in water, it will be wetter than the steamed rice. Therefore, excess water of the boiled rice may be absorbed by cereal flour such as dry wheat flour, rice flour, starch, etc., cellulose powder or talc, before being dried to a water content of 18-70% with, for example, hot air.

The gelatinized rice is forcibly passed through a slit between rolls or pressed between flat plates of metal or plastic, etc. From the viewpoint of productivity and economics, pressing by rolls is preferable.

In case of pressing by rolls, if the gelatinized rice is forcibly passed between metal rolls as it is, the grains join with one another and stick to the rolls. Therefore, it is desirable to dry the boiled rice beforehand so that its moisture content is no more than 70% by weight. If over 70%, it is necessary to lower the temperature of the grain surfaces to some extent. If the rice is dried to less than 18% moisture, it becomes stiff and is broken when pressed. Therefore, in general the most suitable moisture content prior to pressing by rolls is 18-70% for the boiled rice and 18-35% for the steamed rice.

The diameter of the rolls is preferably greater than 50 mm and the rotational speed thereof is preferably less than 25 m/min.

The pressing degree may be adjusted by changing the distance between the rolls through which the gelatinized rice is forcibly passed. If too much pressure is exerted on the gelatinized rice, cracks are produced in the rice resulting in loss of ability for restoration to the original shape of the gelatinized rice. However, if the pressing is too weak, it has no effect. In such instances, it is necessary to adjust the slit between the rolls.

Generally speaking, when the moisture content is high, it is necessary to make the slit between the rolls wider, and vice versa.

As a result of experiments, it has been found desirable that the slit between the rolls be adjusted to 0.1-1.0 mm, as shown in Table 1 under the conditions therein.

TABLE 1

Pressing degree for boiled rice and quality after restoration

| Pressing degree (Distance between rolls in mm) | Apparent specific gravity | Time required for restoration after pouring boiling water (min) | Quality after restoration |
|---|---|---|---|
| No pressing | 0.34 | 7 | Undercooked. Unpleasant feel of eating. |
| (*) | 0.20 | 5 | No elasticity. Unpleasant feel of eating. |
| 1.8 | 0.34 | 7 | Undercooked. Unpleasant feel of eating. |
| 1.6 | 0.33 | 6 | Undercooked. Unpleasant feel of eating. |
| 1.4 | 0.32 | 5 | Partly undercooked. Inferior feel of eating. |
| 1.2 | 0.28 | 4 | |
| 1.0 | 0.27 | 3 | |
| 0.8 | 0.26 | 3 | |
| 0.4 | 0.28 | 3 | As pleasant feel of eating as boiled rice. |
| 0.2 | 0.24 | 1.5 | |
| 0.1 | 0.23 | 1.5 | |
| 0.05 | 0.22 | 1.0 | Not restored to the original granular shape. No elasticity |

Remarks:
(1) Home-grown rice made into gelatinized starch and dried to a moisture content of 26% by weight was passed through the fixed slit between the rolls.
(2) Apparent specific gravity was for puffed rice fried in palm oil at a temperature of 160° C. after adjusting the moisture content of the pressed boiled rice to 13% by weight.
(3) Diameter of the rolls was approximately 200 mm and the revolving speed of the rolls was 10 r.p.m.
(*) Conventional non-flattened puffed boiled rice fried in oil at a temperature of 200° C. for 15 seconds was used.

Japanese Patent Publication No. 46-21770 describes a process of flattening boiled rice to a width of 1.5-2.0 mm, and indicates that flattening to less than 1.5 mm results in flaking of the boiled rice. This is because, in accordance with this publication, free water in boiled rice is evaporated and the boiled rice loses its elasticity as it is flattened by heat rolls whereby the free water is evaporated.

In the present invention, however, it is desirable that the slit between the rolls should be considerably narrower as compared with that used in the Japanese publication process, since puffing of the boiled rice by frying will take place later.

Besides, the present invention differs in the pressing method from that employed in the cited process. Pressing in the present invention does not cause evaporation of free water. It aims at partial destruction or slipping of the internal construction of boiled rice so that puffing by frying is easily accomplished.

The pressed rice is then dried so that its moisture content becomes 8-25% by weight in order to render puffing of the pressed rice easier, and then the frying process is carried out in previously heated edible oil. As shown in Table 2, gelatinized rice which has been pressed can be processed at a lower temperature within a shorter time period as compared with non-pressed gelatinized rice.

TABLE 2

| Frying oil temperature (°C.) | | Oil content after deoiling (%) | Time required for restoration (sec) | Quality after restoration |
|---|---|---|---|---|
| 220 | a. | 19 | 100 | Partially scorched |
|  | b. | 17 | 5 | Scorched |
| 200 | a. | 16 | 180 | No elasticity |
|  | b. | 15 | 15 | Good, but slightly low elasticity |
| 190 | a. | 14 | 240 | Insufficient elasticity |
|  | b. | 13 | 25 | Good |
| 170 | a. | 12 | 360 | Undercooked |
|  | b. | 8 | 30 | Good |
| 150 | a. | 10 | — | Undercooked; No good |
|  | b. | 4 | 120 | Good |
| 130 | a. | — | | Impossible to fry in oil |
|  | b. | 3 | 180 | Good, but slightly undercooked |
| 120 | | | | Impossible to fry in oil |

Remarks:
a.=Non-pressed boiled rice
b.=Pressed boiled rice
Moisture content of rice=13.5% by weight
Distance between the rolls=0.1 mm The oil content of the fried rice following deoiling is preferably less than 16.5% by weight of the rice.

The effective oil temperature used in the present invention ranges from about 130° C. to about 200° C., while non-pressed boiled rice requires 170°-220° C. Thus, flattened boiled rice can be processed at a comparatively lower temperature and this avoids oil from rancidification and lowering of the quality of the products by scorching or other causes.

Frying is generally carried out for a period of 4-25 seconds.

It is remarkable that rice having excellent ability of restoration is obtained in this invention, even when processing at lower temperatures of 130°-170° C.

The function of adequate pressing can be considered as follows:

The gelatinized rice with its adjusted moisture content, adequate plasticity and elasticity is forcibly passed between the rolls so that the grains are pressed and flattened. When it is pressed through an adequately sized slit between the rolls, it is restored to almost its original shape.

When the gelatinized rice is pressed, the internal construction of the rice is partly broken or slipped, causing formation of a number of particles in the interior of the rice. In other words, each grain of rice is converted into a great number of particles which can be easily puffed by frying. As a result, the entire construction of the rice can be heated uniformly and simultaneously, as well as promptly, in the frying process. Therefore, the rice can be fried in oil at a lower temperature in a shorter time compared with non-pressed gelatinized rice, and the entire grain of rice is easily puffed.

Boiling water soaks into the interior of the puffed boiled rice completely as soon as it is poured thereon, and the boiled rice is restored to its original shape uniformly, without any hard core.

Since the construction of the rice is not completely destroyed, but only compressed and slipped, the boiling water will permeate the fried rice sufficiently and promptly to restored it to a complete granular shape.

The fried rice obtained in this invention is far superior to conventional non-pressed gelatinized rice in terms of the time required for restoration, and in flavor and feel of eating after restoration, as shown in Table 1 above.

Pre-cooked rice foodstuffs having as pleasant a feel of eating as boiled rice may be obtained merely by pouring boiling water in the bowl containing the fried rice mixed with powdered soup and a mixture of desiccated vegetables, eggs, meat and the like as desired, for instance, pilaf, frizzled rice, chicken and rice, rice cooked together with various vegetables, meat, shrimps, etc., stew and so on.

As shown in Table 3, the rice fried in oil after being pressed has a better effect on removing oil therefrom and also more uses than non-pressed fried rice.

Rice gruel, baby food, relishes, cakes, etc. can also be made by adjusting the pressing degree and the temperature of the frying oil.

TABLE 3

Pressing degree, amount of oil removed and quality after restoration
(Fried at a temperature of 165° C.)

| Distance between the rolls (mm) | Oil content before deoiling (%) | Oil content after deoiling (%) |
|---|---|---|
| No pressing | 25.0 | 12.1 |
| | 21.3(*) | 14.3 |
| 0.8 | 23.0 | 7.3 |
| 0.4 | 21.2 | 5.1 |
| 0.1 | 23.1 | 7.1 |

(*)In case of deep frying at a temperature of 200° C. for 15 seconds

As the rice processed by frying usually contains 20–30% by weight of oil, it is suitable for foodstuffs such as frizzled rice, pilaf, etc.

However, by removing oil from this fried boiled rice, for example by physical means such as applying centrifugal force or blasting with hot air, or by chemical means such as applying a solvent like ethyl alcohol as mentioned in Japanese Patent Application Nos. 48-68410, 48-68411 and 48-68412, pre-cooked rice foodstuffs suitable for sushi (vinegared fish and rice), boiled rice with tea, white-polished rice, etc. can be obtained.

EXAMPLE 1

2.0 kg of rice grains were washed with water and soaked in water for 15 hours.

After draining off the water, 20 g of monoglyceride was uniformly mixed with the water-soaked grains of rice. Then they were put in a pot and steamed for 25 minutes at a steam pressure of 1 kg/cm$^2$.

The thus gelatinized rice was exposed to a hot air blast of 60°–80° C. so that the moisture content of the rice became 26% by weight, and such partially dried gelatinized rice was forcibly passed through a slit of 1.0 mm between two rolls to obtain pressed rice.

This pressed rice was exposed to hot air having a temperature of 60°–80° C. to reduce its moisture content to 13% by weight. It was then processed in palm oil heated to a temperature of 190° C. for 10 seconds to obtain the ready-to-eat rice.

Furthermore, the following ingredients were placed in a polystyrene bowl:

| | |
|---|---|
| Powdered soup | 6.0 g |
| Freeze-dried mushroom | 0.5 g |
| Freeze-dried shrimp | 1.0 g |
| Freeze-dried egg | 1.0 g |
| Freeze-dried parsley | 0.3 g |
| Freeze-dried green peas | 1.0 g |

Then 100 g of the ready-to-eat rice was added to and mixed with these ingredients. 150 cc of boiling water was poured into the bowl, which was then covered and left standing for three minutes. Thus, pilaf having good flavor and pleasant feel of eating was obtained.

EXAMPLE 2

2.0 kg of rice grains were washed with water and soaked in water for 15 hours.

After draining off the water, 20 g of monoglyceride was uniformly mixed with the water-soaked grains of rice. Then they were placed in a pot and boiled for 25 minutes at a steam pressure of 1 kg/cm$^2$.

The gelatinized rice was then exposed to a hot air blast of 60°–80° C. so that the moisture content of the rice became 30% by weight, and such partially dried gelatinized rice was forcibly passed through a slit of 0.1 mm between two rolls to obtain pressed rice.

This pressed rice was exposed to hot air having a temperature of 60°–80° C. to reduce its moisture content to 24% by weight. It was then processed in palm oil previously heated to a temperature of 140° C. for 10 seconds.

The resultant puffed boiled rice was introduced into a basket-type centrifuge having a diameter of 230 mm and processed therein for 30 seconds at 1,200 r.p.m., maintaining a temperature of 60° C. Thus, puffed boiled rice having an oil content of 5% by weight was obtained.

80 g of the resultant puffed and deoiled rice was placed in a polystyrene bowl. The, the following ingredients were mixed therewith:

| | |
|---|---|
| Powdered soup | 5.0 g |
| Laver | 0.5 g |
| Rice-cake cubes | 2.0 g |

300 cc. of boiling water was poured into the bowl, which was the covered and left standing for three minutes. Thus, a product of boiled rice with tea having as pleasant a feel of eating as boiled rice was obtained.

EXAMPLE 3

Fried rice obtained by the process applied in Example 1 was processed to remove oil in such a way as mentioned in Example 2, and ready-to-eat rice suitable for sushi and which is restored to its original shape with boiling water in three minutes was obtained.

EXAMPLE 4

By changing the temperature of the palm oil to 180° C. instead of 140° C. in the same process as mentioned in Example 2, rice gruel which can be restored to its original shape in 30 seconds with boiling water was obtained.

We claim:

1. A process for preparing ready-to-eat rice which can be reconstituted into a foodstuff essentially in the form of original rice grains, said process consisting essentially of
   (1) soaking grains of an edible rice in water or liquid seasoning, said water or said liquid seasoning having a temperature lower than 70° C. to result in soaked rice having a water content of 30–34% by weight,
   (2) gelatinizing the soaked rice,
   (3) reducing the moisture content of the gelatinized rice to 18–70% by weight,
   (4) forcibly passing the resultant rice grains between rolls spaced 0.1–1.0 mm apart from each other so that the grains are pressed and flattened and the internal structure of the grain is irreversibly changed but the grains are not cracked,
   (5) reducing the moisture content of the pressed and flattened rice grains to 8–25% by weight, and
   (6) frying the thus obtained rice grains in oil at a temperature of 130°–200° C. so as to puff the grains, such that they reconstitute to said form of original rice grains upon adding boiling water.

2. The process according to claim 1, wherein the moisture content of the gelatinized rice is adjusted in step (3) to about 25–35% by weight.

3. The process according to claim 1, wherein the gelatinization is carried out by steaming the soaked rice and wherein the moisture content of the gelatinized rice is adjusted in step (3) to 18–35% by weight.

4. The process according to claim 1, wherein the gelatinization is carried out by means of boiling water.

5. The process according to claim 1, wherein the gelatinization is carried out by steaming the soaked rice under conditions ranging from atmospheric pressure for 30 minutes to a pressure of 3 kg/cm$^2$ for 4 minutes.

6. The process according to claim 1, wherein the moisture content of the gelatinized rice is adjusted in step (3) to 18–35% by weight.

7. The process according to claim 1, wherein the gelatinized rice is dehydrated in step (3) with cereal flour, cellulose powder or talc.

8. The process according to claim 1, wherein a surfactant, edible oil or talc is mixed with the soaked rice prior to gelatinizing.

9. The process according to claim 1, wherein the oil content of the fried rice is less than 16.5% by weight.

* * * * *